US010367726B1

(12) United States Patent
Lokman et al.

(10) Patent No.: US 10,367,726 B1
(45) Date of Patent: Jul. 30, 2019

(54) RANDOMIZED VNF HOPPING IN SOFTWARE DEFINED NETWORKS

(71) Applicant: NETSIA, INC., Sunnyvale, CA (US)

(72) Inventors: Erhan Lokman, Istanbul (TR); Sinan Tatlicioglu, Istanbul (TR)

(73) Assignee: NETSIA, INC., Sunnyvale, CA (US)

( * ) Notice: Subject to any disclaimer, the term of this patent is extended or adjusted under 35 U.S.C. 154(b) by 8 days.

(21) Appl. No.: 15/869,916

(22) Filed: Jan. 12, 2018

(51) Int. Cl.
*H04L 12/24* (2006.01)
*H04L 12/26* (2006.01)
*H04L 12/713* (2013.01)
*H04L 12/715* (2013.01)
*H04L 12/721* (2013.01)
*H04L 12/851* (2013.01)
*H04L 12/911* (2013.01)
*H04L 12/931* (2013.01)
*H04L 29/06* (2006.01)

(52) U.S. Cl.
CPC .......... *H04L 45/38* (2013.01); *H04L 41/0803* (2013.01); *H04L 41/0836* (2013.01); *H04L 41/0893* (2013.01); *H04L 43/14* (2013.01); *H04L 45/566* (2013.01); *H04L 45/586* (2013.01); *H04L 45/64* (2013.01); *H04L 47/2441* (2013.01); *H04L 47/726* (2013.01); *H04L 47/826* (2013.01); *H04L 49/70* (2013.01); *H04L 63/108* (2013.01); *H04L 63/18* (2013.01)

(58) Field of Classification Search
CPC ......... H04L 41/02–32; H04L 43/02–50; H04L 45/02–748; H04L 47/10–41; H04L 47/70–829; H04L 49/70; H04L 63/10–108; H04L 63/18
See application file for complete search history.

(56) References Cited

U.S. PATENT DOCUMENTS

| | | | | |
|---|---|---|---|---|
| 2015/0208318 | A1 | 7/2015 | Mosko et al. | |
| 2017/0019329 | A1* | 1/2017 | Kozat | H04L 45/50 370/400 |
| 2017/0318097 | A1* | 11/2017 | Drew | H04L 67/16 709/226 |
| 2018/0069786 | A1* | 3/2018 | Lokman | H04L 45/48 726/23 |

* cited by examiner

*Primary Examiner* — Timothy J Weidner
(74) *Attorney, Agent, or Firm* — IP Authority, LLC; Ramraj Soundararajan

(57) ABSTRACT

The VNF hopping in a Software Defined Network (SDN) allows a traffic flow to change routes frequently amongst a chosen group of paths to obfuscate data paths or to meet specific performance requirements while satisfying the service chaining requirements by activating in real-time the same virtual functions on each chosen path. Using the VNF hopping method and additional capabilities built into an SDN controller and an orchestrator according to this invention, the controller determines multiple feasible routes for specific flows with desired service chaining functions and enables activation of those chained services, so that the active flow can randomly be assigned to different routes after a switch-over time period expires, or by a special randomization logic within the switch managed by the controller, or manually programmed by a system administrator.

18 Claims, 5 Drawing Sheets

RANDOMIZED VNF HOPPING IN SOFTWARE DEFINED NETWORKS

BACKGROUND OF THE INVENTION

Field of Invention

The present invention relates generally to a system and data communication method in a Software Defined Network (SDN) wherein Virtual Network Functions (VNF) are provided, and more specifically it relates to a data communication method for a traffic flow that receives chained virtualized functions on randomly switched routes. Furthermore, virtualized functions on these switched routes are activated, if they are not active prior to route switching. The goal is to make eavesdropping more difficult for an adversary.

Discussion of Related Art

Software defined networking consists of techniques that facilitate the provisioning of network services in a deterministic, dynamic, and scalable manner. SDN currently refers to approaches of networking in which the control plane is decoupled from the data plane of forwarding functions and assigned to a logically centralized controller, which is the 'brain' of the network. The SDN architecture, with its software programmability, provides agile and automated network configuration and traffic management that is vendor neutral and based on open standards. Network operators, exploiting the programmability of the SDN architecture, are able to dynamically adjust the network's flows to meet the changing needs while optimizing the network resource usage.

An OpenFlow based SDN is formed by switches that forward data packets according to instructions they receive from one or more controllers using the standardized OpenFlow protocol. A controller configures the packet forwarding behavior of switches by setting packet-processing rules in a so-called 'flow table'. Depending on implementation, rather than having one large 'flow table' there may be a pipeline made up of multiple flow tables. A rule in the flow table is composed of a match criteria and actions. The match criteria are multi-layer traffic classifiers that inspect specific fields in the packet header (source MAC address, destination MAC address, VLAN ID, source IP address, destination IP address, source port, etc.), and identify the set of packets to which the actions will be applied. The actions may involve modification of the packet header and/or forwarding through a defined output port. Each packet stream that matches the criteria is called a 'flow'. If there are no rules defined for a particular packet stream, depending on the table-miss configuration set by the network administrator, the switch receiving the packet stream will either discard it or forward it along the control network to the controller requesting instructions on how to forward them.

The controller is the central control point of an SDN and hence vital in the proper operations of network switches. The controller is directly or indirectly attached to each switch forming a control network in which the controller is at the center and all switches are at the edges. OpenFlow protocol runs bi-directionally between the controller and each switch on a secured TCP channel. The control network that is physically stand-alone is called 'out-of band', and is separated from the data network. However, it may also be a secure overlay on the data network (in-band), i.e., sharing the same physical facilities with the data traffic.

One of the key attributes of Software Defined Networks (SDN) is the decoupling of route determination and packet forwarding. Route determination function is performed within the controller. The calculated routes are mapped into so called flow rules, within the controller, which form the set of instructions prepared for each individual network switch, precisely defining where and how to forward the packets of each flow (a traffic stream) passing through that switch. The 'where' part defines to which outgoing port of switch the packet must be sent, whereas the 'how' part defines what changes must be performed to each packet matching a criteria in the flow table (changes in the header fields, for example). The controller sends the flow rules to each network switch, and updates them as the network map changes. Route determination is attributed to the control plane, i.e., the controller, whereas forwarding is attributed to the data plane, i.e., the switches. The controller periodically discovers and updates the network map by sending discovery messages to all network switches. Furthermore, the management plane collects measurements from each switch and reports to the controller, which in turn allows the controller to update the network map when/if there are failures in the network, re-compute routing, update flow tables accordingly and send them to all switches in the network. This is the typical cycle of routing operations in an SDN.

In the current public Internet, the routing and forwarding are both performed within each router. The routing function is performed dynamically by the router logic according to the topology information it collects from other routers. However, for the same destination network, the calculated route is usually the same unless there is a change in the network map (e.g., a failed link or an added or removed router). Meaning, although the routing conditions continuously change, the resultant route is indeed static most of the time. Therefore, in the current Internet, a flow between two points passes from the same routers each time it is set and accordingly an adversary who manages to compromise one of the routers along the data path can capture the entire communications. One of the defenses against vulnerability is the use of encryption so that unless the adversary has the decryption key the communications is kept private. However, the use of encryption has its own costs and security vulnerabilities. A much more economical way to provide privacy is the use of multi-routes between the same end points. Thus, even when the adversary has compromised some of the routers along the way, he will lose track of the communications when the flow's route randomly changes to a different path. This method of using proactive targets is called Moving Target Defense (MTD).

Network Function Virtualization (NFV) decouples network functions from the underlying hardware so that they run as software images on commercial off-the-shelf and purpose-built hardware. It does so by using standard virtualization technologies (networking, computation, and storage). The objective is to reduce the dependence on dedicated, specialized physical devices by allocating and using the physical and virtual resources only when and where they're needed. With this approach, service providers can reduce overall costs by shifting more components to a common physical infrastructure while optimizing its use, allowing them to respond more dynamically to changing market demands by deploying new applications and services as needed. The virtualization of network functions also enables the acceleration of time to market for new services because it allows for a more automated and streamlined approach to service delivery. NFV uses all physical network resources as hardware platforms for virtual machines (VMs)

on which a variety of network-based services can be activated and deactivated on an as needed basis. An NFV platform runs on an off-the-shelf multi-core hardware and is built using software that incorporates carrier-grade features. The NFV platform software is responsible for dynamically reassigning VNFs due to failures and changes in traffic loads, and therefore plays an important role in achieving high availability. Typical Virtualized Network Functions (VNF) that emulate an enterprise's Customer Premises Equipment (CPE) capabilities within the core network are VPN termination, Deep Packet Inspection (DPI), Load Balancing, Network Address Translation (NAT), Firewall (FW), QoS, email, web services, and Intrusion Prevention System (IPS), just to name a few. These are functions typically deployed today within or at the edges of an enterprise network on dedicated hardware/server infrastructure where it may be more appropriate for a service provider to deliver as virtualized network functions.

A key software component called 'orchestrator', which provides management of the virtualized services is responsible for onboarding of new network services and virtual network function packages, service lifecycle management, global resource management, and validation and authorization of NFV resource requests. Orchestrator can remotely activate a collection of virtual functions virtual machines. European Telecommunications Standards Institute (ETSI) provides a comprehensive set of standards defining NFV Management and Orchestration (MANO) interface in various standards documents. For example, the Orchestrator to VNF interface is defined as the Ve-Vnfm interface. There are several other interfaces that tie NVF to the Operations Systems (OSS) and Business Systems (BSS) systems. All of these interfaces and their functions are publicly available in ETSI NVF Reference Architecture documents in ETSI's web pages.

In the past, servers that host the aforementioned services would physically connect to a hardware-based switch located in the data center. Later, with the advent of the concept of 'server virtualization' an access layer is created that changed the paradigm from having to be connected to a physical switch to being able to connect to a 'virtual switch'. This virtual switch is only a software layer that resides within a server that is hosting many virtual machines (VMs) on the same physical server. VMs, or containers, have logical or virtual Ethernet ports. These logical ports connect to a virtual switch. The Open vSwitch (OVS) is the commonly known access layer software that enables to run many VMs on a single physical server machine.

The Network Function Virtualization over SDN must map a customer/enterprise's specific overall service requests to a single service or a chain of services (also known as 'service function chaining'). It must further map the chain of services to specific locations of virtualized network functions and those functions to specific physical platforms (switches, servers, etc.) on which the service will be provided. Fortunately, an information model can provide the schema to model the proper mappings and associations between virtual services and network resources. This information model allows a comprehensive implementation within a relational database (e.g., Structured Query Language—SQL) or hierarchical directory (e.g., Lightweight Directory Access Protocol—LDAP), which can be deployed as a subsystem of the controller, or the orchestrator, or as a separate mediation system between the orchestrator and the controller. Doing so, the network control (SDN/controller) and service management (NFV/orchestrator) operate in complete synchronicity and harmony.

When VNFs are provided in an SDN and service chaining is needed, the route determination task becomes much more complicated. This is because not only the shortest possible route is needed, but also a route is needed that has the desired chain of services with sufficient capacity to handle the traffic. The SDN controller must use the current network map (e.g., locations of switches and facilities) and the mapping of virtual functions onto the network map using said information model.

According to an aspect of this invention, the controller (1) selects multiple paths for a flow with each path providing the same chain of services, (2) activates or capacitates the needed virtual functions on those selected paths by sending proper instructions to MANO functions (orchestrator or the OSS/BSS), and (3) sends instructions to network switches for switching from one route to another according to a set of rules. The controller calculates more than one route beforehand, and when a route path expires it simply removes the related flow rules at the switches and replaces with the new ones. However, in a dynamic environment, continuous removal and set up of new rules is a cumbersome task on the controller, on the switches, and on the control channel between them. Therefore, a need arises for a new method to implement MTD practices in an SDN particularly when specific virtualized functions have to be provided/activated on each of the selected path. Our invention includes methods to ease the above-mentioned route switching process with service chaining, named as VNF hopping, between the same endpoints by sending group flow tables and enable fast switching from one route to another. Embodiments of the present invention are an improvement over prior art systems and methods.

SUMMARY OF THE INVENTION

In one embodiment, the present invention provides a randomized Virtual Network Function (VNF) hopping method implemented in a software defined network (SDN), the SDN comprising a plurality of nodes, each node comprising at least one switch, at least one node further comprising a server hosting a software platform providing at least one virtual network function container, the SDN further comprising at least one controller controlling all switches and at least one orchestrator controlling all virtualized network function containers, the at least one controller and the at least one orchestrator directly communicating with each other, the method as implemented in the at least one controller comprising the steps of: (a) determining at least two feasible forwarding paths for a given packet flow with at least one type of VNF on each of the two feasible forwarding paths, wherein the at least two feasible forwarding paths are determined using the following: (1) a logic within the controller, (2) a network map, (3) a VNF map showing the locations of virtual functions on the network map, and (4) one or more specific instructions applicable for the given packet flow; (b) ensuring that the at least one type of VNF in (a) is available or that the at least one type of VNF is activated on one node in both the at least two feasible forwarding paths in (a); (c) sending an instruction to the at least one orchestrator to activate/capacitate the at least one type of VNF function on each of the at least two feasible forwarding paths in (a) when they are not readily activated or do not have enough storage capacity; and (d) sending the at least two feasible forwarding paths determined in (a) together as a group flow table for the given packet flow to one or more switches along the at least two feasible forwarding paths, wherein each of the one or more switches configures, within it, a randomization logic describing how and when to switch between the two feasible forwarding paths.

In another embodiment, the present invention provides a controller in a software defined network (SDN) implementing a randomized Virtual Network Function (VNF) hopping method, the SDN comprising a plurality of nodes, each node comprising at least one switch, at least one node further comprising a server hosting a software platform providing at least one virtual network function container, the SDN further comprising at least one controller controlling all switches and at least one orchestrator controlling all virtualized network function containers, the at least one controller and the at least one orchestrator directly communicating with each other, the controller comprising: (a) a route manager subsystem processing randomized VNF hopping requests; (b) a network mapper subsystem determining an existing network map in real-time; (c) a VNF mapper subsystem determining a VNF map which is the locations and status of VNFs on the network map; (d) a route calculator subsystem evaluating the existing network map and the VNF map determined in (b) and (c), respectively, and determining at least two feasible forwarding paths for a given packet flow with at least one type of VNF on each of the two feasible forwarding paths, wherein the at least two feasible forwarding paths are determined using the following: (1) a logic within the controller, (2) a network map, (3) a VNF map showing the locations of virtual functions on the network map, and (4) one or more specific instructions applicable for the given packet flow, the route calculator subsystem sending the determined at least two feasible forwarding paths together as a group flow table for the packet flow to one or more switches along the at least two feasible forwarding paths; (e) a VNF activator subsystem activating/capacitating a VNF on determined paths if that VNF is not active or do not have enough capacity on chosen forwarding paths; (f) a group flow table generator subsystem generating the group table with the at least two feasible forwarding paths determined in (d), and wherein the controller sends an instruction to the at least one orchestrator to activate/capacitate the at least one type of VNF function on each of the at least two feasible forwarding paths in (d) when they are not readily activated or do not have enough storage capacity; and the controller sends the at least two feasible forwarding paths determined in (d) together as a group flow table for the given packet flow to one or more switches along the at least two feasible forwarding paths, wherein each of the one or more switches configures, within it, a randomization logic describing how and when to switch between the two feasible forwarding paths.

In one embodiment, the present invention provides an article of manufacture comprising non-transitory computer storage medium storing computer readable program code which, when executed by a processor in a single node, implements a randomized Virtual Network Function (VNF) hopping method implemented in a software defined network (SDN), the SDN comprising a plurality of nodes, each node comprising at least one switch, at least one node further comprising a server hosting a software platform providing at least one virtual network function container, the SDN further comprising at least one controller controlling all switches and at least one orchestrator controlling all virtualized network function containers, the at least one controller and the at least one orchestrator directly communicating with each other, the medium comprising: (a) computer readable program code executed by the processor to determine at least two feasible forwarding paths for a given packet flow with at least one type of VNF on each of the two feasible forwarding paths, wherein the at least two feasible forwarding paths are determined using the following: (1) a logic within the controller, (2) a network map, (3) a VNF map showing the locations of virtual functions on the network map, and (4) one or more specific instructions applicable for the given packet flow; (b) computer readable program code executed by the processor to ensure that the at least one type of VNF in (a) is available or that the at least one type of VNF is activated on one node in both the at least two feasible forwarding paths in (a); (c) computer readable program code executed by the processor to send an instruction to the at least one orchestrator to activate/capacitate the at least one type of VNF function on each of the at least two feasible forwarding paths in (a) when they are not readily activated or do not have enough storage capacity; and (d) computer readable program code executed by the processor to send the at least two feasible forwarding paths determined in (a) together as a group flow table for the given packet flow to one or more switches along the at least two feasible forwarding paths, wherein each of the one or more switches configures, within it, a randomization logic describing how and when to switch between the two feasible forwarding paths.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
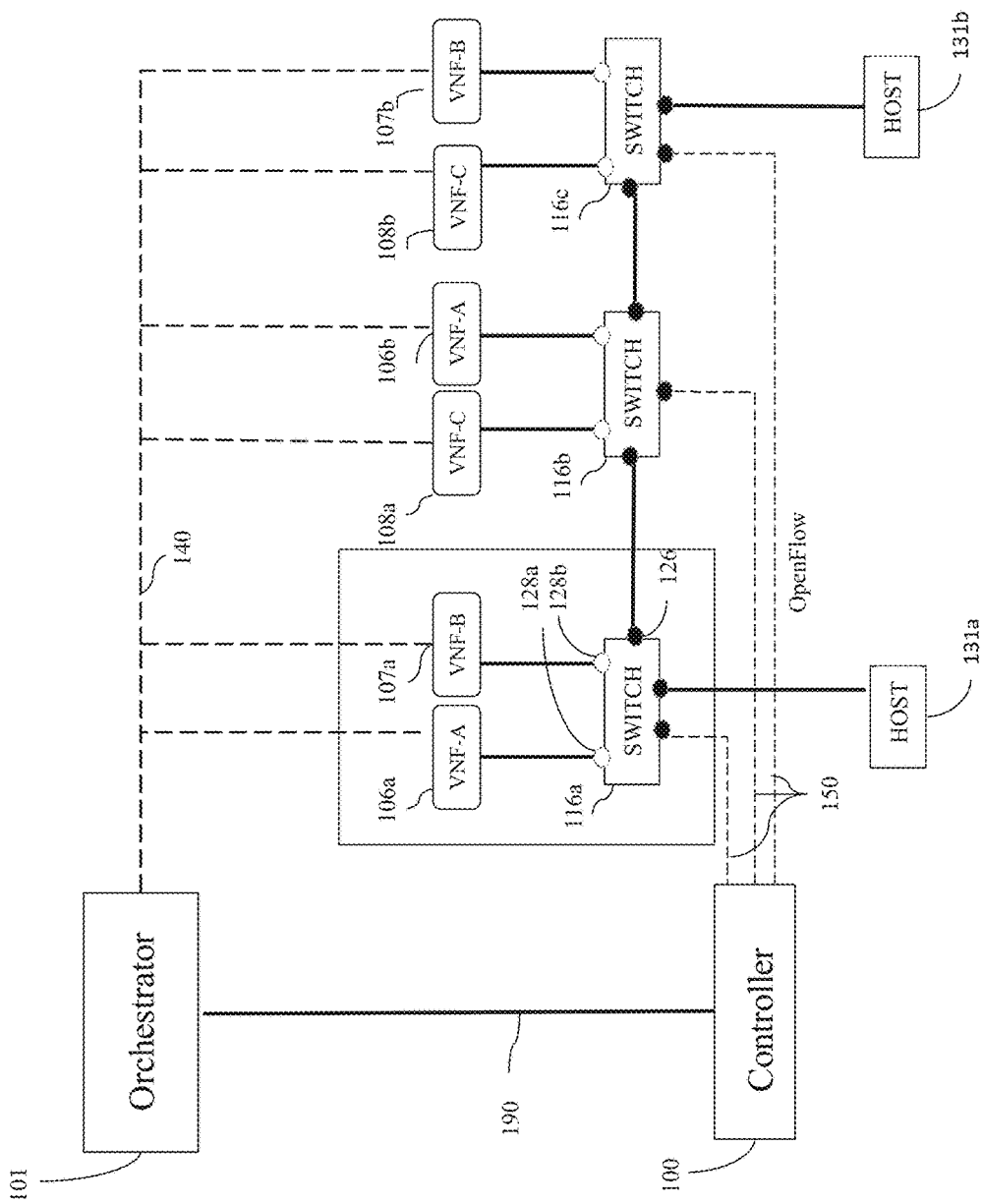
FIG. 1 illustrates a simple network showing an SDN and VNF.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

As used herein, a network device such as a switch, or a controller is a piece of networking equipment, including hardware and software that communicatively interconnects other equipment on the network (e.g., other network devices, end systems). Switches provide multiple layer networking functions (e.g., routing, bridging, VLAN (virtual LAN) switching, Layer 2 switching, Quality of Service, and/or subscriber management), and/or provide support for traffic coming from multiple application services (e.g., data, voice, and video). A network device is generally identified by its media access (MAC) address, Internet protocol (IP) address/subnet, network sockets/ports, and/or upper OSI layer identifiers.

Note while the illustrated examples in the specification discuss mainly on SDN system with a layered Network Function Virtualization (NFV) architecture, embodiments of the invention may be implemented in non-SDN systems. It can be implemented in networks wherein data can hop multiple paths. Unless specified otherwise, the embodiments of the invention apply to any controller of the layered network architecture, i.e., they are NOT limited to an SDN controller. Although the controller is shown to have direct communications with an orchestrator, it is possible to implement it via indirect communications through a mediation system between the orchestrator and the controller. Furthermore, the control of VNFs may be through a system named other than orchestrator. Such architectural alternatives should be considered within the coverage of this invention.

A system and a method for VNF hopping in a Software Defined Network (SDN) are described. Using the VNF hopping method, based on a user or operator defined metrics and triggers, the SDN controller determines multiple routes for a specific flow. Link, path or sub-network-avoidance and obfuscation of a routing path for increased security, congestion-avoidance for improved network performance or for specific application types, operator-avoidance for reduced cost, are just a few drivers for calculating alternative routes. When all the usable routes are calculated the controller pushes all of them to all of the relevant switches at once such that for the same flow there are more than one flow rule in a relevant switch and the switch replaces the active flow rule with one of the alternative flow rules according to a random logic provided by the controller or the switch by itself. Thus, random VNF hopping is utilized without the controller intervention every time an active route expires.

Possible routes for a flow are determined within the controller a priori or in real-time at the beginning of the flow. Multiple routes (flow table rules) are sent to the switches along with additional instructions defining the switch behavior as to how/when to hop the traffic flow in a group flow table. The switch behavior towards the multiple routes can also be configured into the switches using the management interface, i.e., using OF-Config (OpenFlow Management and Configuration Protocol) or using OpenFlow protocol by the controller. At the moment neither a network management protocol, nor OpenFlow protocol supports this feature. The mentioned protocols can be extended to include parameters to control the multipath behavior of the Openflow switches.

VNF hopping paths are determined within a controller subsystem called 'Route Calculator' which takes into account the network map, the VNF map and route measurements and various other inputs to calculate several alternative paths for a specific flow. Route Calculator can solve a simple graph optimization problem with a cost function describing an objective, such as a minimal path length, cost, or delay, and constraints such as specific ordered list of chained virtual services, performance threshold, link or path avoidance, etc. The solution of such an integer-programming problem is a heuristic, and can centrally be solved within the controller.

In US 20150208318 A1, Mosko et al. describe a service-oriented routing approach in software-defined network particularly for a mobile ad-hoc network. The controller has a receiving mechanism from a source mobile node, a request for a service, with the request including an identifier associated with the requested service; an identification mechanism configured to identify a destination mobile node that provides the service associated with the identifier; a path-computation mechanism configured to compute a path between the source mobile node and the destination mobile node using a network graph for the mobile nodes; and a path-sending mechanism configured to send the computed path to at least the destination mobile node, which facilitates establishing a route between the source mobile node and the destination mobile node. However, Mosko does not describe determining multiple routes for the same flow and routes being used at different times by rerouting traffic.

SDN switches are simple packet forwarding devices whose sole function is fast packet relaying according to a set of rules provided by the SDN controller. When no rules are provided, the switch does not know where to forward packets. So, configuring ports with VLAN IDs or IP numbers is not sufficient to make the switch function as a layer-2/3 forwarding device. It needs the matching criteria and rules to determine where and how to the forward packets.

This invention allows calculation of multiple paths as a group for the same flow that requires service chaining such that the active route can hop periodically or at random time intervals between these multiple paths without needing the controller to govern the process. The key objective of switching the flow to an alternate path is obfuscation of the route for security reasons while continuing to provide the services requested by the user. In this scenario, random routing paths can be calculated a priori, virtual services requested on the each path can be activated a priori, and the corresponding flow rules can be sent to the switches along the calculated paths wherein the method for switching from one route to another is configured within the switch. The system of this invention can determine the alternate routes in real-time as well as a priori. When the controller detects network conditions that require a route switching, it can immediately send a group of alternative routes and instruct the switches to route-hop the flow. Meaning, when determined in real-time, the switching from one route to another can be performed by a simple flow rule replacement.

We envision two types of flows: regular flows that do not require route switching, and the VNF hopping flows that require periodic or random switchover to alternate routes, as defined by an aspect of this invention. VNF hopping flows constitute only a tiny fraction of all flows. Thus, the regular flow-rule generation by the controller and the forwarding behavior within the switches as defined by OpenFlow remain unchanged. Only an additional treatment for VNF hopping flows is needed within the controller and switches. Here are the new concepts associated with randomized VNF hopping:

1. A flow table of a specific VNF hopping flow that has multiple forwarding actions per flow wherein only one forwarding action for the flow is active at any point in time. Each forwarding action defines a different route. The forwarding actions other than the active action are in a 'pending' state for activation. A group flow table has at least two routes corresponding to the same flow, and therefore two different forwarding actions, one in active the other in pending state at any point in time. The OpenFlow specification allows for a concept of 'group flow table' wherein multiple so-called 'buckets' with each bucket defining a different action on the same flow is allowed. However, OpenFlow specification does not define how/when the switch switches from one action to another. A random hopping logic inside the switch can be implemented so that the switch randomly chooses by its own to decide the next active route. The same logic can also be configured by a switch-management interface such as OF-Config or by OpenFlow using the switch control interface, or by manually using a console interface.

2. A timer associated with a specific action in a group table. When this timer expires, next forwarding action associated with each flow becomes active, while the previous action changes state to pending. After the flow hops through all listed routes in the table, the process returns to the top of the list, and so on. There may be one timer per group (e.g., 20 seconds). Alternatively, there may be different timers per action. The timer(s) may be send to the switch using OF-config protocol using the switch management interface, or with OpenFlow using the switch control interface, or manually set using a console interface.

3. A time-out parameter to age an existing route in a group. For example, if there is N number of routes for a group to hop, all these routes are sent at the same time to the switch as a group. These routes will be in an ordered list wherein the most desirable routes will be on the top of the list. When the route time-out expires for the route that is at the top of the list, the switch will start using the next route in the list until all N routes are used up and timed-out. Each time a route is timed-out, the switch may send an OpenFLow 'flow-removed' message to the controller. Note that the time-out associated with each route entry in the flow table may be identical or different. When all the entries are timed-out, and the 'flow-removed' message is sent to the controller for all buckets of the group, the controller will determine the new group with again multiple buckets/actions and a time-out value per route and send it to the switches along the route paths. Alternatively, when the switch does not have any instructions remaining for that flow and has not received a new flow table yet, and it will send the flow to the controller in order to ask for forwarding instructions. The routes in the new group may be identical to the ones in the previous table or different. For example, if there are only two feasible routes for a specific flow, each time the controller sends a new group, the actions will correspond to these same two routes. However, the time-out periods of the two routes may be different. Furthermore, the routes in the flow table may be listed in a different order and the associated time-out periods may be different making obfuscation somewhat more random than using a fixed switch-over timer. The downside of this approach compared to the timer approach is that the controller will need to repeatedly send the groups (with possibly the same list of small finite number of feasible routes), as opposed to sending the table only one time as in the timer option. The upside of this approach is the enhanced obfuscation with randomized time-out periods per route and sequence of routes. The time-out parameter(s) may be send to the switch using OF-config protocol using the switch management interface, or with OpenFlow using the switch control interface, or manually set using a console interface.

4. The route selection process works in a coupled manner with VNF selection for those routes in the route group. If the desired VNFs are not provided on a desirable route (a potential route for the group), that route is not selected. If the desired VNFs are not active or have enough capacity on a desirable route, but can be activated or capacitated, then the route stays as a potential route in the group.

FIG. 1 illustrates a simple three-node SDN with an overlaid NFV infrastructure in which the controller of this invention is deployed. The network is comprised of several VNFs actively operating in a network node. These VNFs may physically be hosted on the switch hardware or on adjunct server platforms that directly connect to the collocated switch. Each VNF may reside on a separate hardware or many VNFs may share the same hardware. There are three different types of virtualized network functions, namely VNF-A (Encryptor), VNF-B (Load Balancer) and VNF-C(Network Address Translator), which are distributed across three switching nodes: Switching node 116a has co-located VNF-A 106a and VNF-B 107a, switching node 116b hosts VNF-C 108a and VNF-A 106b, and switching node 116c has co-located VNF-C 108b and VNF-B 107b. Note that orchestrator 101 manages VNFs 106a,b, 107a,b and 108a,b using MANO interface 140, known in prior art.

Controller 100 in FIG. 1 manages network switches 116a, 116b and 116c using a control link 150 (e.g., running OpenFlow protocol). Each control link ties controller 100 to the switches 116a, 116b and 116c sending and receiving control messages. Furthermore, controller 100 is tied into orchestrator 101. According to an embodiment of this invention, this key interface is used for (a) controller 100 to send directives to the orchestrator to activate, deactivate or capacitate VNFs distributed throughout the network that controller 100 controls, and (b) controller 100 to receive information on status (up, down, percent load, etc.) of each VNF from orchestrator 101.

Hosts 131a and 131b in FIG. 1 are attached to switches 116a and 116c, respectively, receiving both data transport (routing) and services (NAT, Encryption, etc.) from the network. Hosts are personal computers, servers, workstations, super computers, cell phones, etc. On switch 116a, Network Interface Card (NIC) 126 connects to a facility that is also connected to switch 116b to transmit data packets towards switch 116b. The Virtual NIC (VNIC)s 128a, 128b connect VNF-A and VNF-B, respectively to switch 116a. VNICs 128a and 128b have unique IP addresses and may physically map an actual NIC signifying the attachment point of the server hosting these virtual service. The IP address of a VNIC, which is the address of a specific VNF dynamically changes since a VNF can be activated or deactivated, and move into another server platform in the network.

Figure 2A:
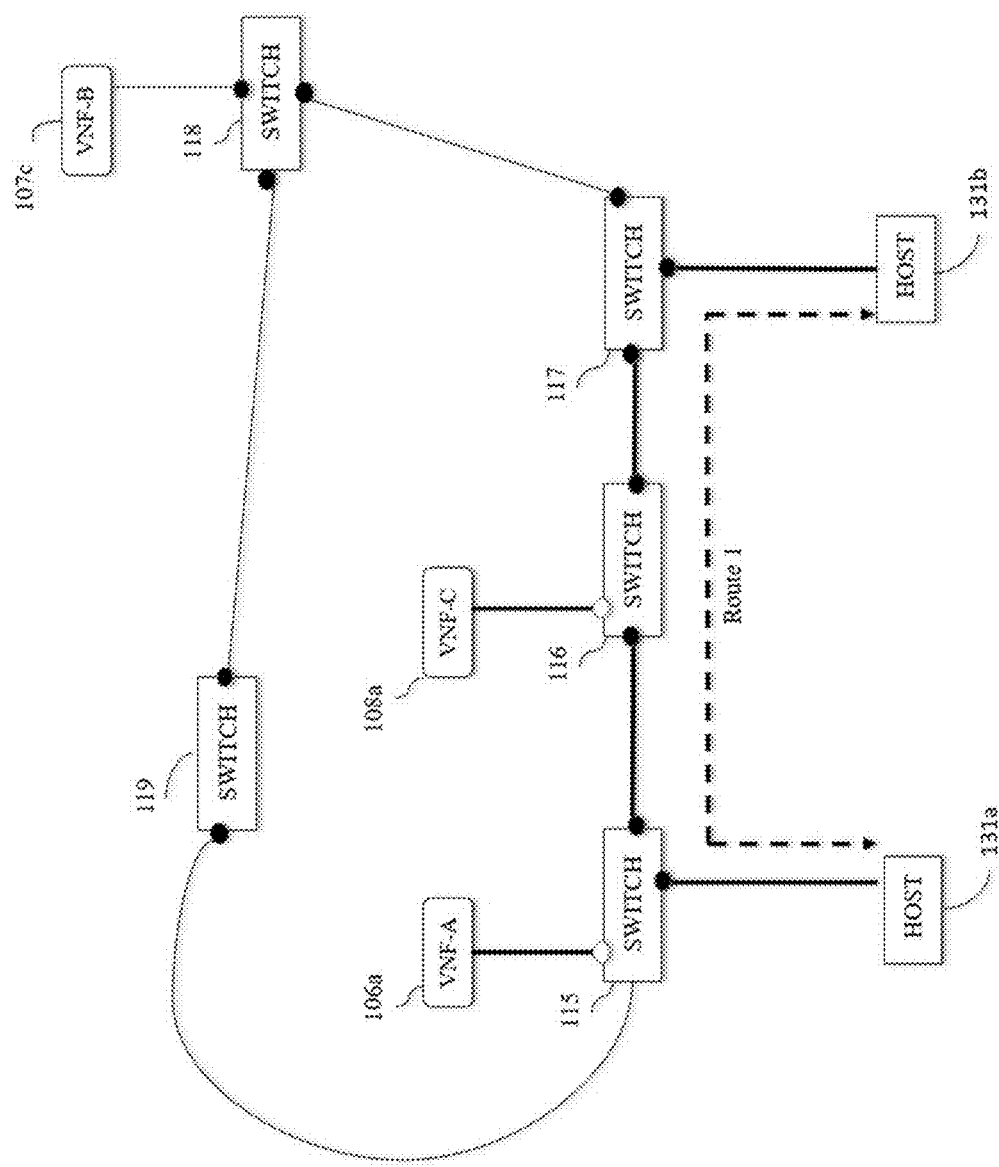
FIGS. 2A and 2B illustrate two possible routes calculated according to an aspect of this invention.
Figure 2B:
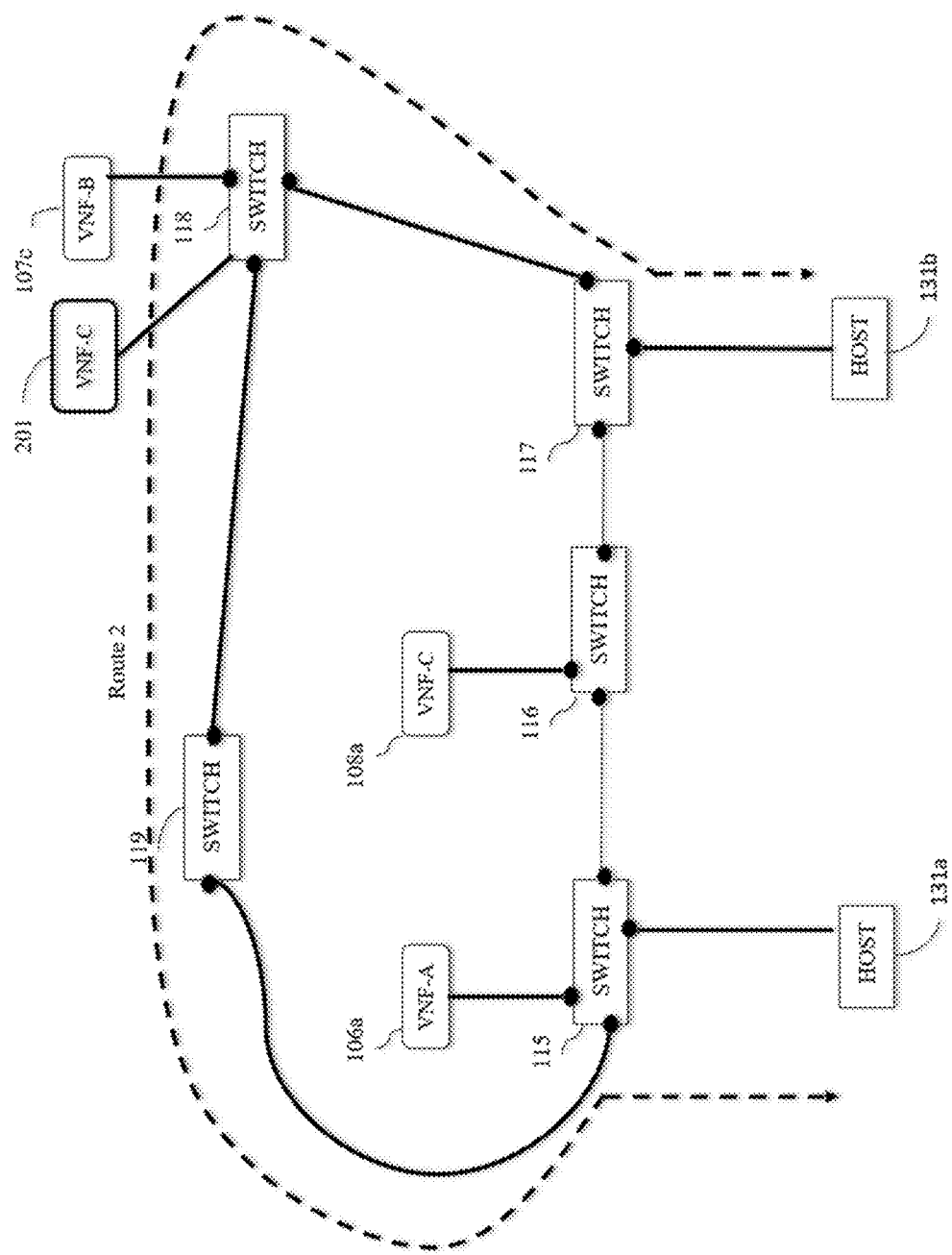

FIG. 2 illustrates a simple network with two feasible routes for a data flow with chained-services of VNF-A and VNF-C (in that specific order) between hosts 131a and 131b. Route 1 as shown in FIG. 2(*a*) passes through switch 115, 116 and 117. The data flow's path traversing the chained virtual services is defined as follows:

Route 1=
[host 131a➔ switch 115]➔
[switch 115➔ VNF-A 106a➔ switch 115]➔
[switch 115➔ switch 116]➔
[switch 116➔ VNF-C 108a➔ switch 116]➔
[switch 116➔ switch 117]➔
[switch 117➔ host 131b]

Route 2 as shown in FIG. 2(*b*) passes through switch 115, 119 and 118. Since there is no VNF-C on that route, controller 100 instructs orchestrator 101 to activate VNF-C on the server platform that currently hosts VNF-B adjacent to switch 118. Once orchestrator 101 activates VNC-C 201, Route 2 now satisfies the requirements. The new route is as follows:

Route 2=
[host 131a➔ switch 115]➔
[switch 115➔ VNF-A 106a➔ switch 115]➔
[switch 115➔ switch 119]➔
[switch 119➔ switch 118]➔
[switch 118➔ VNF-C 201➔ switch 118]➔
[switch 118➔ switch 117]➔
[switch 117➔ host 131b]

The resultant route group for this traffic is [Route 1; Route 2]. Controller 100 generates a group flow table for these two routes, and sends them using OpenFlow protocol to switches 115, 116, 117, 118 and 119. Once these switches install the group flow table and apply either the switch-over timer or time-out method (whichever is specified), the randomized VNF hopping becomes available for host 131a-131b data flow.

Figure 3:
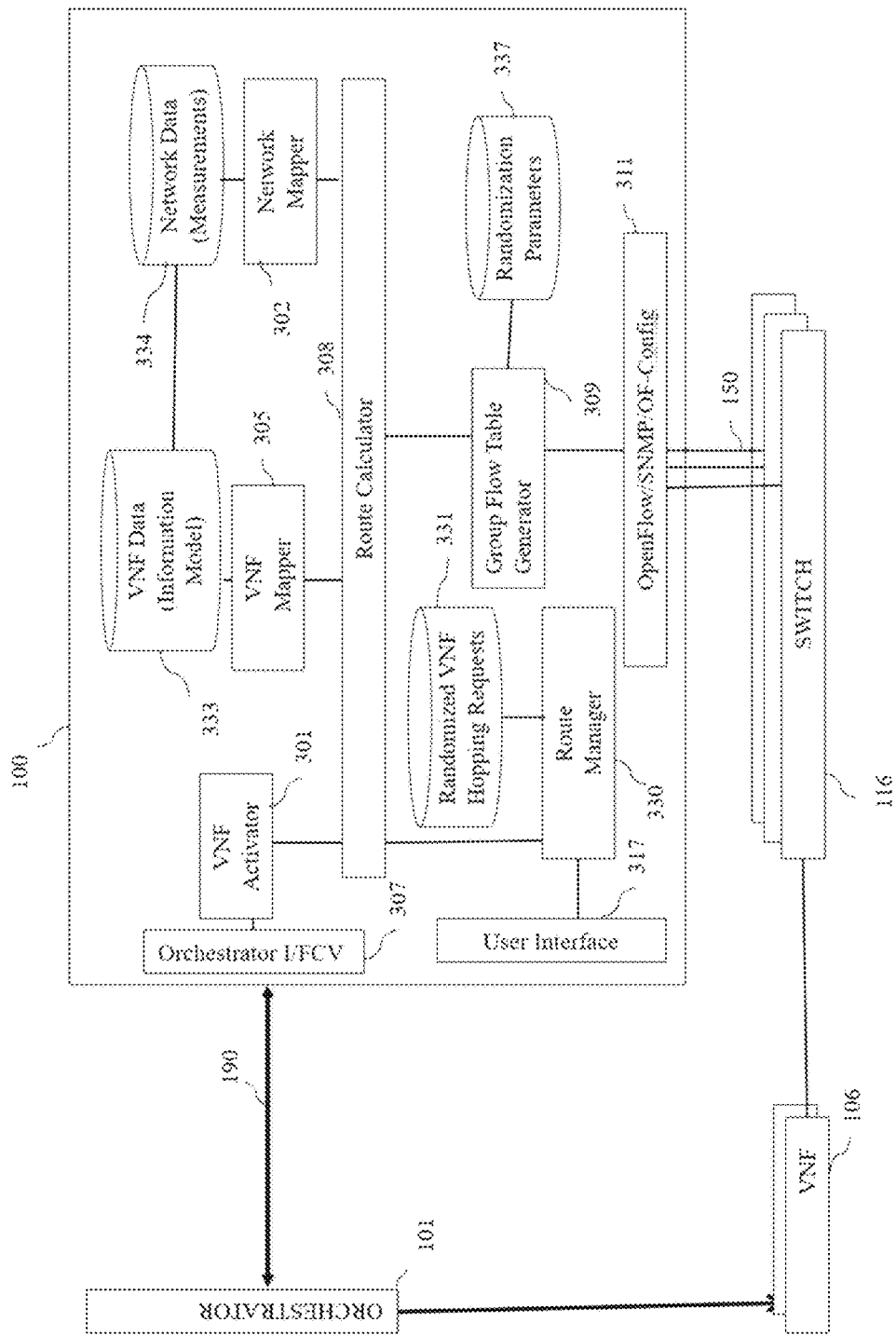
FIG. 3 illustrates a high-level block diagram of the controller with randomized VNF hopping function.
Figure 4:
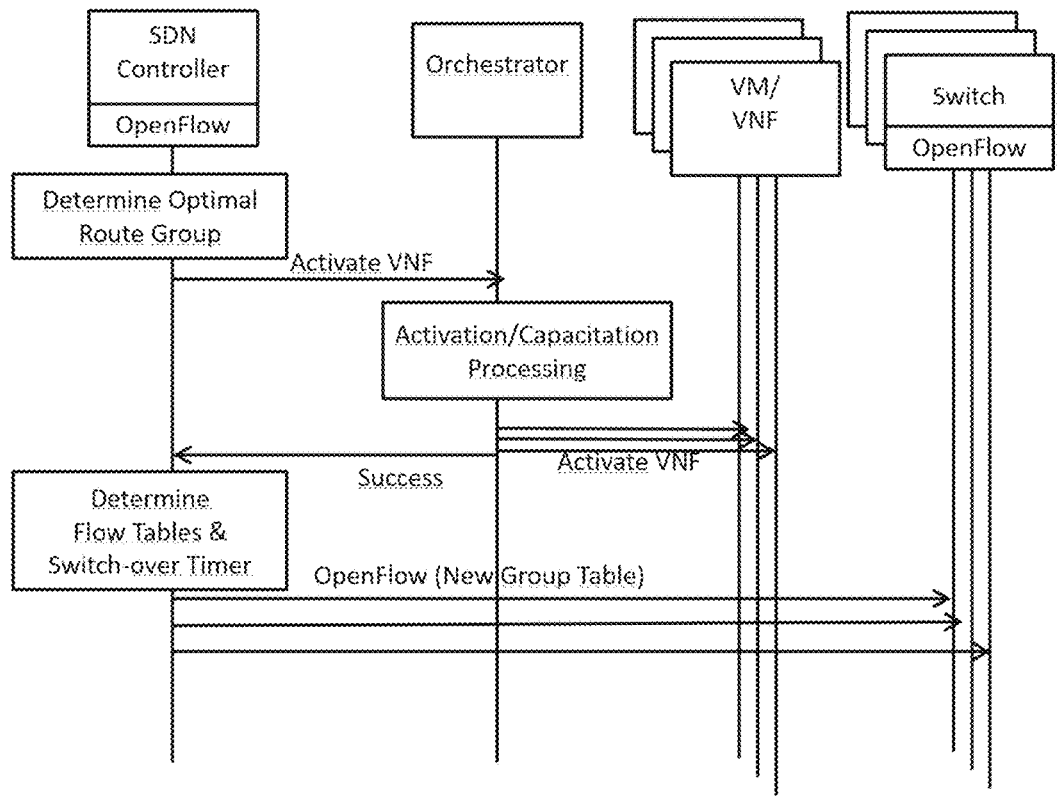
FIG. 4 illustrates a simple flow chart of randomized VNF hopping steps.

FIG. 3 depicts a high-level block diagram of additional functions needed in controller 100 to support randomized VNF hopping.

Route Manager 330 is where the requests for randomized VNF hopping is made for specific flows. For security reasons, this application may reside within the same computer of Controller 100 or within another computer securely connected to Controller 100. It has a user interface 317 to add/delete and modify such requests by the network operator or a user. Database 331 contains the information about each randomized VNF hopping request (such as the IP address of the origination and destination of the flow, flow directionality, QoS requirements, application type, start and end time of the request, VNF service type, VNF preferences such as the order, etc.).

Right before the start time of a randomized VNF hopping request, Route Manager 330 sends the request to Route Calculator 308, which is the heart of this invention. The determination of randomized alternate routes for the flow is performed there. Route Calculator 308 takes as input the most recent network map from Network Mapper 302 and the VNF map from VNF Mapper 305. The measurements collected on network routes (when needed, for example, if link performances such as delay and packet loss are among the constraints for the route selection) are stored in database 334. VNF Mapper 305 uses Database 333, which stores VNF information, such as the locations, types, IP addresses, capacities and current utilization of VNFs. Network Mapper 302 derives the network map, i.e., the connectivity between switches, using OpenFlow protocol's network discovery process. OpenFlow interface 150 is between Controller 100 and each network switch 116. The map is kept up to date by frequently executing network discovery processes.

Controller 100 may also collect measurements from network switches using a protocol such as OF-CONFIG or SNMP, which is not shown in FIG. 3 for simplicity. Controller 100 collects, filters, and aggregates network performance measurements in real-time and stores them in database 334. Controller 100 may also set the 'group flow table' parameters for randomized VNF hopping requests, such as the switch-over timer and time-out period using OF-CONFIG or SNMP.

VNF Mapper 305 continuously collects data on VNFs using interface 190 towards the orchestrator 101. The data collection can be made from an OSS instead of orchestrator 101 in some cases.

Route Calculator 308 determines the route groups for a specific randomized VNF hopping requests by either solving an optimization problem or by simply enumerating and filtering possible routes. Once routes are determined, it sends requests to VNF activator 301 to activate missing VNFs or capacitate existing ones on the routes to provide a desired performance. It sends feasible route groups to Group Flow Table Generator 309, which determines the corresponding group flow tables with associated route time-outs and switch-over timers, and sends them to network switches on interface 150.

Randomization logic is a key function of Group Table Generator 309 that controls route switching process from one forwarding path to another. For example, it is programmed to use a switch-over timer or an action time-out method, or to switch between forwarding paths randomly or in a sequence, or to increment/decrement timers by certain increments to incorporate even more randomization. Randomization logic collaborates with OpenFlow/SNMP/OF-CONFIG 311 as to how to execute action processing within a group table. It has the logic to select one of the forwarding paths as active while others are in pending state. Randomization logic stores parameters associated with the randomization logic in Database 337, which can be set by OF-Config or the OpenFlow protocol. These parameters can be the identical for all group tables, or there can be a different set applicable to each group table.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein.

The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of Randomized VNF Hopping in Software Defined Networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

Randomized VNF hopping in a Software Defined Network (SDN) allows traffic flows to change the VNF service points frequently to obfuscate data paths or to meet specific performance requirements. Using the route switching method of this invention, the controller determines multiple feasible routes for specific flows and assigns the chained virtual services, so that the active flow can randomly be assigned to different routes after a switch-over time period expires, or by a special randomization logic within the switch managed by the controller, or manually programmed by a system administrator.

The invention claimed is:

1. A randomized Virtual Network Function (VNF) hopping method implemented in a software defined network (SDN), the SDN comprising a plurality of nodes, each node comprising at least one switch, at least one node further comprising a server hosting a software platform providing at least one virtual network function container, the SDN further comprising at least one controller controlling all switches and at least one orchestrator controlling all virtualized network function containers, the at least one controller and the at least one orchestrator directly communicating with each other, the method as implemented in the at least one controller comprising the steps of:
- (a) determining at least two feasible forwarding paths for a given packet flow with at least one type of VNF on each of the two feasible forwarding paths, wherein the at least two feasible forwarding paths are determined using the following: (1) a logic within the controller, (2) a network map, (3) a VNF map showing the locations of virtual functions on the network map, and (4) one or more specific instructions applicable for the given packet flow;
- (b) ensuring that the at least one type of VNF in (a) is available or that the at least one type of VNF is activated on one node in both the at least two feasible forwarding paths in (a);
- (c) sending an instruction to the at least one orchestrator to activate/capacitate the at least one type of VNF function on each of the at least two feasible forwarding paths in (a) when they are not readily activated or do not have enough storage capacity; and
- (d) sending the at least two feasible forwarding paths determined in (a) together as a group flow table for the given packet flow to one or more switches along the at least two feasible forwarding paths, wherein each of the one or more switches configures, within it, a randomization logic describing how and when to switch between the two feasible forwarding paths.

2. The randomized VNF hopping method of claim 1, wherein at least one of the one or more specific instructions is an instruction to avoid one of the following: one or more insecure links, one or more specific network segments, or one or more networks.

3. The randomized VNF hopping method of claim 1, wherein the randomization logic is a path switching according to a specific timer per forwarding path or per group of forwarding paths.

4. The randomized VNF hopping method of claim 1, wherein the randomization logic is a path switching after a time-out period expires per forwarding path.

5. The randomized VNF hopping method of claim 1, wherein the at least two feasible forwarding paths have no common intermediate switches.

6. The randomized VNF hopping method of claim 1, wherein the at least two feasible forwarding paths have equivalent quality of services.

7. A controller in a software defined network (SDN) implementing a randomized Virtual Network Function (VNF) hopping method, the SDN comprising a plurality of nodes, each node comprising at least one switch, at least one node further comprising a server hosting a software platform providing at least one virtual network function container, the SDN further comprising at least one controller controlling all switches and at least one orchestrator controlling all virtualized network function containers, the at least one controller and the at least one orchestrator directly communicating with each other, the controller comprising:
- (a) a route manager subsystem processing randomized VNF hopping requests;
- (b) a network mapper subsystem determining an existing network map in real-time;
- (c) a VNF mapper subsystem determining a VNF map which is the locations and status of VNFs on the network map;
- (d) a route calculator subsystem evaluating the existing network map and the VNF map determined in (b) and (c), respectively, and determining at least two feasible forwarding paths for a given packet flow with at least one type of VNF on each of the two feasible forwarding paths, wherein the at least two feasible forwarding paths are determined using the following: (1) a logic within the controller, (2) a network map, (3) a VNF map showing the locations of virtual functions on the network map, and (4) one or more specific instructions applicable for the given packet flow, the route calculator subsystem sending the determined at least two feasible forwarding paths together as a group flow table for the packet flow to one or more switches along the at least two feasible forwarding paths;
- (e) a VNF activator subsystem activating/capacitating a VNF on determined paths if that VNF is not active or do not have enough capacity on chosen forwarding paths;
- (f) a group flow table generator subsystem generating the group table with the at least two feasible forwarding paths determined in (d), and wherein the controller sends an instruction to the at least one orchestrator to activate/capacitate the at least one type of VNF function on each of the at least two feasible forwarding paths in (d) when they are not readily activated or do not have enough storage capacity; and the controller sends the at least two feasible forwarding paths determined in (d) together as a group flow table for the given packet flow to one or more switches along the at least two feasible forwarding paths, wherein each of the one or more switches configures, within it, a randomization logic describing how and when to switch between the two feasible forwarding paths.

8. The controller of claim 7, wherein the at least two feasible forwarding paths have no common intermediate switches.

9. The controller of claim 7, wherein the at least two feasible forwarding paths have equivalent quality of services.

10. The controller of claim 7, wherein the at least two feasible forwarding paths are determined using a logic within the controller, a network map, a VNF mapper, and one or more specific instructions applicable for the packet flow.

11. The controller of claim 10, wherein at least one of the one or more specific instructions is an instruction to avoid one of the following: one or more insecure links, one or more specific network segments, or one or more networks.

12. The controller of claim 10, wherein at least one of the one or more specific instructions is to activate/capacitate or deactivate a VNF along a path by communicating with the orchestrator.

13. An article of manufacture comprising non-transitory computer storage medium storing computer readable program code which, when executed by a processor in a single node, implements a randomized Virtual Network Function (VNF) hopping method implemented in a software defined network (SDN), the SDN comprising a plurality of nodes, each node comprising at least one switch, at least one node further comprising a server hosting a software platform providing at least one virtual network function container, the SDN further comprising at least one controller controlling all switches and at least one orchestrator controlling all virtualized network function containers, the at least one controller and the at least one orchestrator directly communicating with each other, the medium comprising:
- (a) computer readable program code executed by the processor to determine at least two feasible forwarding paths for a given packet flow with at least one type of VNF on each of the two feasible forwarding paths, wherein the at least two feasible forwarding paths are determined using the following: (1) a logic within the controller, (2) a network map, (3) a VNF map showing the locations of virtual functions on the network map, and (4) one or more specific instructions applicable for the given packet flow;

(b) computer readable program code executed by the processor to ensure that the at least one type of VNF in (a) is available or that the at least one type of VNF is activated on one node in both the at least two feasible forwarding paths in (a);

(c) computer readable program code executed by the processor to send an instruction to the at least one orchestrator to activate/capacitate the at least one type of VNF function on each of the at least two feasible forwarding paths in (a) when they are not readily activated or do not have enough storage capacity; and (d) computer readable program code executed by the processor to send the at least two feasible forwarding paths determined in (a) together as a group flow table for the given packet flow to one or more switches along the at least two feasible forwarding paths, wherein each of the one or more switches configures, within it, a randomization logic describing how and when to switch between the two feasible forwarding paths.

14. The article of manufacture of claim 13, wherein at least one of the one or more specific instructions is an instruction to avoid one of the following: one or more insecure links, one or more specific network segments, or one or more networks.

15. The article of manufacture of claim 13, wherein the randomization logic is a path switching according to a specific timer per forwarding path or per group of forwarding paths.

16. The article of manufacture of claim 13, wherein the randomization logic is a path switching after a time-out period expires per forwarding path.

17. The article of manufacture of claim 13, wherein the at least two feasible forwarding paths have no common intermediate switches.

18. The article of manufacture of claim 13, wherein the at least two feasible forwarding paths have equivalent quality of services.

* * * * *